(12) United States Patent
Townsend

(10) Patent No.: US 7,114,539 B2
(45) Date of Patent: Oct. 3, 2006

(54) BICYCLE TIRE HAVING TREAD WITH PROJECTING RIBS

(76) Inventor: Lloyd Townsend, 4 Bannold Road, Waterbeach, Cambridge, CAMBS CB 5 9LQ (GB)

( * ) Notice: Subject to any disclaimer, the term of this patent is extended or adjusted under 35 U.S.C. 154(b) by 129 days.

(21) Appl. No.: 10/850,025

(22) Filed: May 19, 2004

(65) Prior Publication Data

US 2004/0231774 A1    Nov. 25, 2004

(30) Foreign Application Priority Data

May 23, 2003  (GB) .................................. 0311848.6

(51) Int. Cl.
*B60C 11/03*  (2006.01)
*B60C 11/117*  (2006.01)
*B60C 11/13*  (2006.01)

(52) U.S. Cl. ............................ 152/209.11; 152/209.15; 152/209.17; 152/209.22

(58) Field of Classification Search ............ 152/209.11, 152/209.15, 209.17, 209.22; D12/543, 577, D12/536, 544, 571, 579
See application file for complete search history.

(56) References Cited

U.S. PATENT DOCUMENTS

| 1,210,933 | A | * | 1/1917 | Hamm | 152/209.17 |
| 1,225,459 | A | * | 5/1917 | Mauk | 152/209.17 |
| D72,825 | S | * | 6/1927 | Gillam | 152/209.22 |
| 3,001,568 | A | * | 9/1961 | Suominen | 152/209.15 |
| 4,240,484 | A | * | 12/1980 | Kojima et al. | 152/209.11 |
| 4,353,402 | A | * | 10/1982 | Burche et al. | 152/209.22 |
| 4,570,689 | A | * | 2/1986 | Kazusa et al. | 152/209.11 |

FOREIGN PATENT DOCUMENTS

| GB | 1423575 | * | 2/1976 |
| GB | 2347654 | * | 9/2000 |

* cited by examiner

*Primary Examiner*—Steven D. Maki
(74) *Attorney, Agent, or Firm*—Smith-Hill and Bedell

(57) ABSTRACT

A bicycle tire 10 is described having a tread that comprises transverse channels defining a block tread pattern for improving grip when the tire is used in off-road conditions. Two axially spaced circumferentially continuous parallel ribs 14 straddle the tire centreline and project radially beyond the block tread pattern to improve ride quality on a smooth road surface.

4 Claims, 1 Drawing Sheet

BICYCLE TIRE HAVING TREAD WITH PROJECTING RIBS

CROSS REFERENCE TO RELATED APPLICATION

This application claims priority under 35 USC 119 of United Kingdom Patent Application No. 0311848.6 filed May 23, 2003.

FIELD OF THE INVENTION

This invention relates to bicycle tyres and in particular is concerned with a tread pattern for a bicycle tyre.

BACKGROUND OF THE INVENTION

Bicycle tyres have been evolving into different areas. For use on a hard surface, such an asphalt covered metalled road, a relatively smooth tread pattern is desirable for improved speed and reduced noise and vibration. On the softer surfaces that are encountered off-road, such as soil and mud, a block tread pattern (i.e. a tread pattern with wide deep transverse channels that define protruding blocks or studs) is desirable, to allow the tyre to bite into the ground and provide improved traction.

Over time, some tyre manufacturers have tried to develop tyre treads that aim to combine both these features into a universal use tread pattern. Historically, this has been attempted by forming a single central rib in the tread which allows the tyre to run smoothly on harder surfaces and forming a block tread on each side of the central to allow limited cornering traction on soft surfaces.

This design of tyre with a single central rib was found to compromise the drive and brake traction on softer surfaces, or else it failed to deliver smooth quite performance on hard surfaces.

SUMMARY OF THE INVENTION

According to the present invention, there is provided a bicycle tyre having a tread that comprises transverse channels defining a block tread pattern for improving grip when the tyre is used in off-road conditions, wherein two axially spaced circumferentially continuous parallel ribs are provided which are separated by a gap which overlies the tyre centreline and project radially beyond the block tread pattern to improve ride quality on a smooth road surface by impeding contact between the block pattern and the road surface.

Preferably, the tread pattern additionally defines transversely extending lands having a radial height less than that of the two radially projecting ribs and arranged within the gap to interconnect the two radially projecting ribs at circumferentially spaced intervals. The ribs and lands together give the appearance of a railway track encircling the centreline of the tyre, with the rails represented by the radially protruding ribs and the ties by the transverse lands.

The lands preferably have a radial height that is less than that of the blocks of the block tread pattern.

The block tread pattern may have any configuration suitable for providing improved grip during off-road conditions, but it is preferred for it to have a chequer board pattern in which the corners of the blocks are contiguous so as to support one another.

To maximise the benefit derived from the tread pattern proposed in the present invention, the tyre to which the tread is applied should also be capable of operating at different inflation pressures. For sustained use in straight lines on a smooth road surface, the tyre should be run at relatively high pressures, thus reducing the tyre casing distortion from surface contact, and allowing the main contact points to be the tops of the two parallel ribs. On loose or soft surfaces, where traction from studs is desirable, the tyre should be run at lower pressures, allowing a larger tyre footprint and thereby permitting the various additional studs or blocks in the block tread pattern to perform their function.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
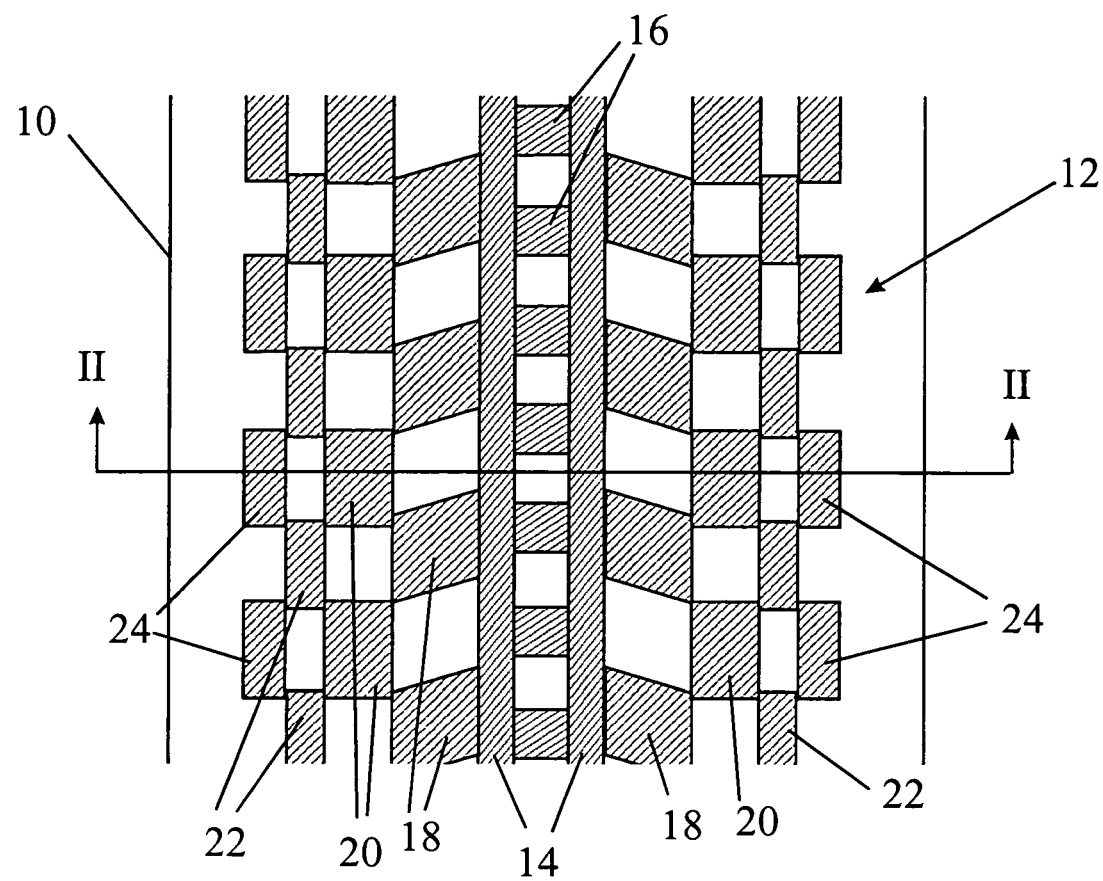
FIG. 1 is a flat view of a short section the tread pattern of a tyre in accordance with the invention.

In the drawings, a bicycle tyre 10 has a tread pattern, generally designated 12, the protruding parts of the tread pattern being shown shaded in FIG. 1. The tread pattern is symmetrical about the centreline and its salient difference from previously proposed tread patterns resides in two continuous parallel ribs 16 which straddle the tyre centreline. The ribs are interconnected by lands 16 to give he appearance of a railway track encircling the tyre.

Figure 2:
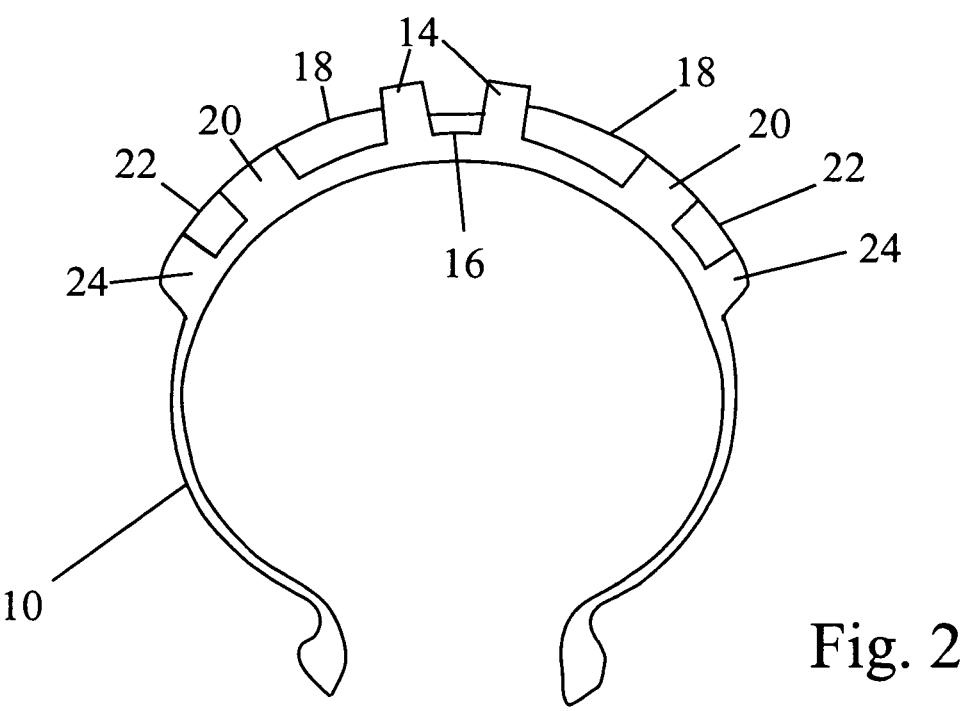
FIG. 2 is a section along the line II—II in FIG. 1 when the tyre is inflated.

To each side of the ribs 16, there are formed four rows of blocks or studs 18, 20, 22 and 24 of which the corners are contiguous to define a block tread pattern resembling a checker board. As can be seen from FIG. 2, the two ribs 14 project radially beyond the blocks 18, 20, 22 and 24 of the block tread pattern and the lands 16 between the ribs 14 project radially less than these blocks.

|  | Width | Length | Height |
|---|---|---|---|
| Ribs 14 | 4 mm | Continuous | 4.5 mm |
| Lands 16 | 6 mm | 5 mm | 2.5 mm |
| Blocks 18 | 10 mm | 10 mm | 3.5 mm |
| Blocks 20 | 8 mm | 12 mm | 3.5 mm |
| Blocks 22 | 4 mm | 10 mm | 3.5 mm |
| Blocks 24 | 5 mm | 12 mm | 3.5 mm |

The table above lists dimensions that have been found to be suitable for the ribs, lands and blocks of a bicycle wheel. In the table, "width" refers to the axial dimension, "length" to the circumferentially dimension and "height" to the radial dimension. It should be stressed that these dimensions are given only as an example.

The ribs 16 are marginally raised above the blocks of the checker board pattern to achieve smooth rolling, low vibration, low noise effect on hard surfaces.

The lands 16 offer drive and brake traction on loose surfaces in straight line performance, while the blocks 18, 20, 22 and 24 offer varying levels of drive traction and cornering traction.

The overlap between the blocks of the block tread pattern is not essential but it assists in forming a self supporting tread design, better capable of withstanding lateral flex that may be experienced during cornering.

It has been found, surprisingly, that the gap between the two ribs 16 does not fill up with dirt when the tyre is used in off road conditions. It is believed that the reason for this is that when the tyre footprint is flattened against the ground, the ribs move towards one another and they separate again when no longer in contact with the ground. This axial oscillation of the ribs dislodges any dirt that would otherwise be trapped between them and also assists the ribs is gripping the ground during off-road operation.

The invention claimed is:

1. A bicycle tyre having a tread that comprises transverse channels defining a block tread pattern for improving grip when the tyre is used in off-road conditions, wherein two axially spaced circumferentially continuous parallel ribs are provided which are separated by a gap that overlies the tyre centreline and project radially beyond the block tread pattern to improve ride quality on a smooth road surface by impeding contact between the block tread pattern and the road surface and wherein the tread pattern additionally defines transversely extending lands having a radial height less than that of the two radially projecting ribs and arranged within the gap to interconnect the two radially projecting ribs at circumferentially spaced intervals.

2. A bicycle tyre as claimed in claim 1, wherein the lands have a radial height less than that of the blocks of the block tread pattern.

3. A bicycle tyre as claimed in claim 1, the blocks of the block tread pattern are contiguous so as to be mutually supporting.

4. A bicycle tyre as claimed in claim 1, wherein the two ribs have a width of 4 mm and are arranged 6 mm apart.

* * * * *